Figure 1:
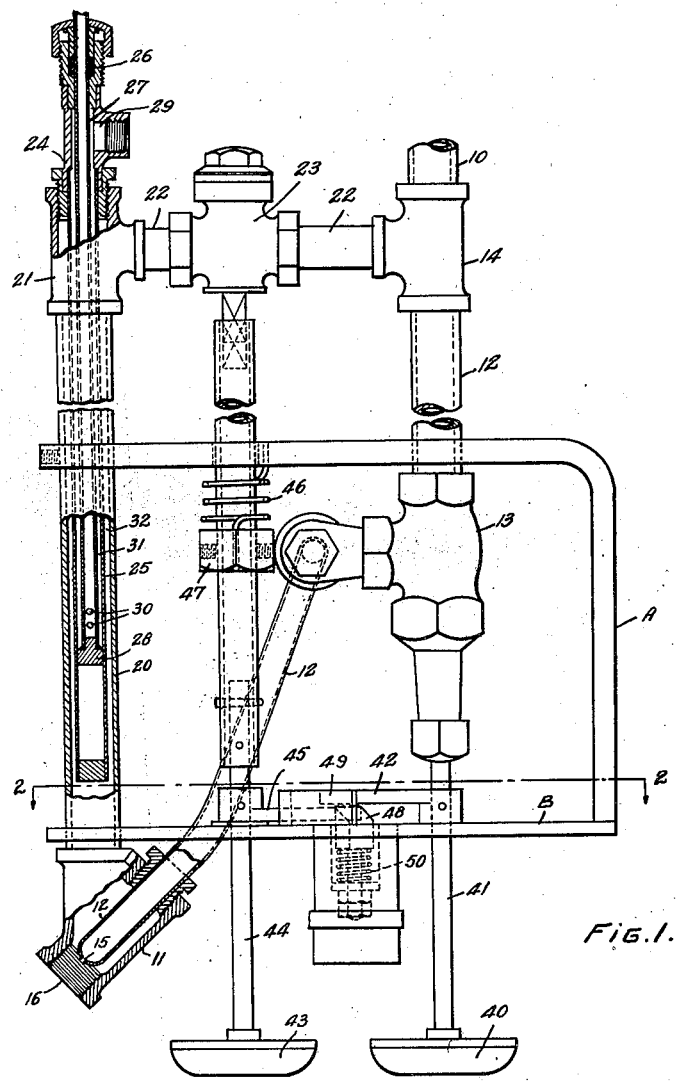

Sept. 3, 1940. J. L. BIELER 2,213,895
WATER HEATING AND MIXING INSTALLATION
Filed Sept. 19, 1938

Inventor
Jacques Louis Bieler
By Jean Swabey
Attorney.

Patented Sept. 3, 1940

2,213,895

UNITED STATES PATENT OFFICE 2,213,895

WATER HEATING AND MIXING INSTALLATION

Jacques Louis Bieler, Montreal, Quebec, Canada

Application September 19, 1938, Serial No. 230,705

6 Claims. (Cl. 126—344)

This invention relates to an apparatus for supplying hot and cold water.

It is a principal object of the invention to provide an apparatus of this nature which is particularly applicable for use in shower baths, gang washing troughs, or for any other purpose in which adjustable hot and cold water may be required.

It is a further object of the invention to provide a simple inexpensive and safely operable apparatus of this nature to heat water adjacent the outlet, in combination with means for supplying the water at adjustable temperatures without danger of scalding the user.

It is a further object of the invention to provide an apparatus of this nature whereby steam may conveniently be employed as a heating medium.

For industrial applications, the essential characteristics of a hot water supplying apparatus, especially for shower bath use, are economy and safety. Obviously excessive first cost is a prohibitive factor. Safety, the factor sometimes given second place, is in reality of prime importance. It has a direct bearing upon economy by acting as insurance against possible damage claims by employees for scalds sustained through the use of mechanisms, which are not safely operable or suffer from mechanical defects.

As an economical heating medium, steam is ideal usually being available throughout industrial establishments. The only drawback with steam is that it has not as a general rule been as carefully employed as it might have been, with the result that it is sometimes regarded as dangerous. As will be seen, this is not necessarily the case, any accidents being generally the result of the shortcomings in the apparatus employed for the heating of water with steam as the heating medium.

Referring now to accepted methods of heating water with steam, perhaps one of the simplest has been to mix steam and water, controlling each by a separate valve. This is usually accomplished by the use of an apparatus including specially designed chambers arranged to minimize water hammer. While this system is currently used in industry, it is dangerous, since it is quite easy to have an excess of steam in proportion to the water, either by faulty adjustment of the valves, or, through the water supply being inadvertently cut off.

Various systems have been developed to avoid this danger. The one generally employed is a central hot water storage tank with an internal or external steam heated coil. However, unless the steam is controlled by a thermostat this system is also dangerous. Besides, it is unsuitable for use in large industrial plants since the long supply lines from the central tank to the outlet dissipate the heat. If, at the same time tanks and thermostats have to be installed at each point of use, the expense becomes prohibitive.

Then there are thermostatically controlled steam and water mixing valves. Of these, the cheaper installations are quite unreliable and the more expensive models are safe only if the thermostat is kept in repair by regular attention. Some valves of this type are also inconvenient, in that they require the steam to be turned off when the apparatus is not in use.

In addition to the devices mentioned, there is the type in which automatic valves are provided to turn off the steam, thus preventing a spray of steam or of excessively hot water should the pressure drop off. In this apparatus, there is also the ever present danger of the valves sticking, which might easily cause an immediate supply of scalding water.

The two last-mentioned systems usually also require a certain ratio of pressure between steam and water, necessitating the installation of a reducing valve on either line to bring the higher pressure in to correct relationship with the lower.

In contrast, the apparatus of the present invention operates on a different principle to those described, namely that of heating water by means of a unit of adjustably limited heating capacity. It is featured by a heat exchanger adjacent the outlet, and a valve controlling the hot water positioned between the heat exchanger and a supply of cold water to be heated. The chamber of the heat exchanger is arranged to have a very small volume so as to heat only a small amount of water at one time and the effective surface of the heating element is adjustable. The mechanism for controlling the valves is also such that it is not possible to turn on an initial burst of water sufficiently hot to injure the shower occupant.

Having thus generally referred to the invention, a specific example of its embodiment in a practicably applicable device will be described with the assistance of the accompanying drawing, in which, Figure 1 is a side elevation partly in section showing a shower bath unit constructed according to the present invention.

Figure 2:
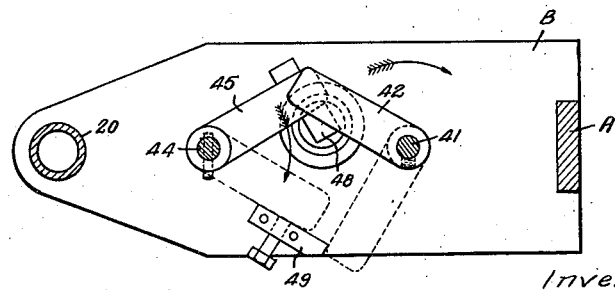

Figure 2 is a cross section taken along the line 2—2 of Figure 1.

Referring more specifically to the drawing, A is a bracket for supporting a water heating and supplying apparatus for a shower bath. 10 is a pipe leading from a suitable cold water supply and 11 is a mouthpiece, as for instance a Y, designed to eject a mixture of hot and cold water. The mouthpiece 11 is connected at its lower end with a suitable nozzle. Cold water is supplied to the mouthpiece 11 through a pipe 12 connected to the pipe 10 by a T 14 and controlled by a valve 13. The mouthpiece 11 is connected to an upwardly extending hot water supply pipe or chamber 20. At the upper end of the pipe 20 is a T 21 connected through pipes 22, and a valve or cock 23 (this valve will henceforth be called the hot water control valve) with the T 14, and thus with the cold water supply pipe 10. As will be seen, the pipe or chamber 20 serves as the heat exchanger, in passing through which the water is heated. The valves or equivalent elements 13 and 23 are of a conventional nature best suited to their particular function in this structure.

The mouthpiece 11 is designed to serve as a mixing chamber for hot and cold water. The pipe 12 projects into the mouthpiece 11 as indicated in Figure 1 and is provided with an outlet 15 considerably smaller in diameter than the pipe itself. The hot water pipe 20 enters the mouthpiece 11 along side the pipe 12 so that the hot water must contact the cold water before it emerges through the openings 16 formed between the walls of the mouthpiece 11 and the pipe 12. The mouthpiece 11 must be placed in a position such that it and tube 20 may drain easily when the water is turned off.

Rigidly connected to the T 21 through connecting means 24 and extending within the pipe 20 is a tube 25 adapted to serve as the heating element. Having a sliding connection with a gland 26 at the top of the tube 25 is a tube 27 adapted to extend downwards within the tube 25. Plugging the foot of the tube 27 and mushrooming laterally therefrom to bear snugly against the sides of the tube 25 is a sliding plug 28. In the manner described, the tube 27 is mounted, with the gland 26 and the plug 28 as bearings, for sliding movement in trombone fashion, axially in the tube 25. Through this arrangement it is possible to move the tube 27 up and down within the tube 25 so as to vary the length of the former located within the latter. The tube 25 is provided with a steam inlet connection 29, while the foot of the tube 27 is also provided with condensate inlets 30, the top of the tube 27 being equipped to eject condensate. In this manner, the space between the walls of the tubes 25 and 27 forms a steam chamber 31 of adjustable length through which the steam passes before condensing and emerging through the inlets 30 and the condensate tube 27. The space between the walls of the pipes 20 and 25 adjacent the chamber 31 forms a passage 32 within which the water is heated.

The valve 13 is controlled from a valve handle 40 through a valve stem 41, consisting in this instance of a pair of rods extending from the valve and the handle respectively and interconnected by a tubular member. Connected to the valve stem 41 just above the base B is an inwardly extending arm 42. The valve 23 is controlled through a valve handle 43 and a valve stem 44. The valve stem 44 includes an inwardly extending arm 45 normally disped on a plane beneath the arm 42. The arms 42 and 45 are adapted in certain positions to overlap and are each adapted to move in a clockwise direction (looking down as in Figure 2) until they contact the stop 49. A compression spring 46 works against the bracket A and a collar 47 mounted on the stem 44, so as to urge the stem in a downward direction and also to exert a torque tending to keep the valve in the open position.

The arms 42 and 45, when in the valve-closed position, are disposed substantially as shown in full lines in Figure 2 with the arm 42 overlapping the arm 45 and when in the valve-opened position are as indicated in dotted lines. A latch 48 urged upwardly by the spring 50 normally prevents the arm 45 being moved to valve-open position when the arm 42 is in valve-closed position, but allows the arm 45 to be moved from the open position to the closed position irrespective of the position of the arm 42.

*Operation*

When the steam supply is turned on, steam passes into the chamber 31 between the walls of the tubes 25 and 27, where it condenses and then down through the openings 30 and up the interior of the condensate tube 27. Thus, when steam is supplied constantly, the walls of the tube 25, above the plug 28, are always kept at steam heat. Water passing through the chamber 32 between the walls of the pipe 20 and the tube 25 is thus heated rapidly owing to the high temperature of the surface to which the small amount of water is exposed. The extent of the heating surface of the tube 25 may be regulated by the up and down adjustment of the tube 27 through its slideable mounting.

To turn on the water the cold water control valve 13 must first be operated by turning the handle 40 in a clockwise direction (looking down as in Figure 2). Then the valve 23 controlling the hot water supply may be turned on by pushing the handle 43 upwards against the compression spring 46 until the arm 45 clears the latch 48, and then letting the handle 43 turn in a clockwise direction into full open position, by the torque action of the spring 46. The temperature of the mixture of hot and cold water is then regulated entirely by the adjustment of the cold water valve 13 through the handle 40. The hot water may be turned off independently of the cold, so that a cold water shower may be had if desired.

When the shower is turned off water will remain in the chamber 32, but this water being of very small volume will quickly turn into steam and dissipate. When the shower is turned on again there is no chance, according to the structure of the apparatus, of the hot water being turned on first and causing a burst of hot water; the hot water must always strike the cold before it emerges from the mouthpiece 11 and so the first rush of hot water from the pipe 20 will be tempered before it reaches the shower nozzle. Also, the reduced area of the opening 15 has a Venturi effect on the stream of cold water for lessening the pressure in the mixing chamber to such an extent that the cold water has no tendency to climb up the tube 20.

There is also created a turbulence in the water passing through the heating chamber 32 which is believed, with the small cross-section of this chamber, to assist in the rapid heating of the water. Thus, a relatively short heating tube 25 may be employed. For example, in a practical shower bath installation, a copper tube of ½″ outside diameter having a length of only 30″ was found sufficiently long to transfer an adequate amount of heat, when used inside a galvanized iron pipe having an inside diameter of ⅝". This example is, of course, illustrative only and is given merely to demonstrate the efficiency of the heat transfer apparatus of the present invention.

Many advantages will appear from the utilization of principles underlying the apparatus described. It will be understood however that the detailed description is illustrative only of one form of the invention as used in a shower bath installation. Various modifications and applications according to the invention may be made without departing from the spirit thereof or the scope of the claims, so that the exact forms shown are to be taken as illustrative only and not in a limiting sense; it is desired that only such limitations shall be placed thereon as are disclosed in the prior art or are set forth in the accompanying claims.

I claim:

1. In a hot water heating and mixing apparatus, a water supply and an outlet, respective hot and cold water passages leading from said supply to said outlet, heating means in said hot water passage between said supply and said outlet, means for supplying water to said hot water passage, a valve controlling each of said passages, a stem on each valve, a first arm connected to the stem of the hot water control valve, a second arm connected to the stem of the cold water valve, a latch for preventing the movement of the first arm to the valve-open position, said second arm overlapping said first arm when the valves are in the closed position to prevent the first arm clearing the latch, said first arm being moveable to clear the latch only when the second arm has been rotated to move the cold water valve into an open position, retaining means associated with the stem of said cold water valve and acting on connecting means associated with the stem of the hot water valve to retain the hot water valve in the closed position until the hot water valve is moved to an open position, means urging the hot water valve towards the full open position on release by said retaining means of said connecting means.

2. In a hot water heating and mixing apparatus, a water supply and an outlet, respective hot and cold water passages leading from said supply to said outlet, heating means in said hot water passage between said supply and said outlet, means for supplying water to said hot water passage, a valve controlling each of said passages, a stem on each valve, retaining means associated with the stem of the cold water valve and adapted to cooperate with the connecting means associated with the stem of the hot water valve to retain the hot water valve closed when the cold water valve is in closed position, means for urging the hot water valve towards the full open position on release of said connecting means, and means for manipulating each valve.

3. In a hot water heating and mixing apparatus, a water supply and an outlet, respective hot and cold water passages leading from said supply to said outlet, heating means in said hot water passage between said supply and said outlet, means for supplying water in said hot water passage, a valve controlling each of said passages, a stem on each valve, a first arm connected to the stem of the hot water control valve, a second arm connected to the stem of the cold water control valve, a latch for preventing the movement of the first arm to the valve-open position, said second arm overlapping said first arm when the valves are in the closed position to prevent the first arm clearing the latch, said first arm being moveable to clear the latch only when the second arm has been rotated to the valve-open position, said hot water valve stem including a member to which said first arm is attached, said member being manually moveable axially of its stem to permit the first arm to clear the latch, and a spring acting on said member to urge it against said latch clearing movement and to exert a torque upon it towards the valve-open position, said latch being operable to permit movement of said first arm in the valve closing direction irrespective of the position of said second arm.

4. In an apparatus of the type described, in combination with a water supply and a common outlet for hot and cold water, a hot water passage leading from said supply to said outlet, a cold water passage leading from said supply to said outlet, a valve controlling each passage, a heating element in the hot water passage between the hot water valve and the outlet, and means for preventing the hot water valve being turned on before the cold water valve.

5. In a hot water heating and mixing apparatus, a water supply and a common outlet for hot and cold water, respective hot and cold water passages between said supply and said outlet, a valve controlling each passage, a heating element in the hot water passage between the hot water valve and the outlet, means for varying the extent of the effective heating surface of said element within said passage, means for operating said valves, and means for preventing the hot water valve being turned on before the cold water valve.

6. In an apparatus of the type described, in combination with a water supply and a common outlet for hot and cold water, means for conveying hot and cold water from said supply to said outlet, a heating element associated with said means, respective valves for controlling the hot and cold water supply to said outlet, means for controlling each valve, and means for preventing the hot water control valve being turned on before the cold water valve.

JACQUES LOUIS BIELER.